United States Patent [19]
Welland

[11] 3,879,984
[45] Apr. 29, 1975

[54] GAS FLOW CONTROL

[76] Inventor: John Michael Welland, 16 Valleyside, Hemel Hempstead, England

[22] Filed: Mar. 15, 1973

[21] Appl. No.: 341,514

Related U.S. Application Data

[63] Continuation-in-part of Ser. No. 116,553, Feb. 18, 1971, abandoned.

[52] U.S. Cl. ............... 73/23.1; 137/110; 137/599.1
[51] Int. Cl. ............... G01n 31/08
[58] Field of Search ........... 137/501, 505.13, 599.1, 137/110; 23/232 C; 73/23.1

[56] References Cited

UNITED STATES PATENTS

| | | | |
|---|---|---|---|
| 1,729,819 | 10/1929 | Campbell | 137/505.13 X |
| 2,042,860 | 6/1936 | Peabody et al. | 137/501 X |
| 2,898,928 | 8/1959 | Kehoe | 137/501 X |
| 3,240,052 | 3/1966 | Reinecke et al. | 73/23.1 |
| 3,405,551 | 10/1968 | Halasz | 73/23.1 |

*Primary Examiner*—William R. Cline
*Attorney, Agent, or Firm*—John K. Conant

[57] ABSTRACT

This is a flow control system for maintaining a constant flow rate of a gas to detector of gas chromatographic apparatus at various flow rates of the gas through the chromatographic column of the apparatus from which the gas flows to the detector, the gas being fed into the apparatus at a constant pressure. The subject system includes a flow regulator in the main gas flow to the column; the flow regulator consists of a pressure responsive valve resiliently biased to its open position, a gas flow impedance upstream from the valve, and a pressure conducting connection from the upstream side of the impedance, the whole being arranged for controlling the valve opening in proportion to changes in the pressure at the downstream side of the impedance so as to provide a constant pressure at the downstream side of the impedance. A by-pass flow path has one end coupled into the main flow path between the downstream side of the impedance and the valve, and its other end coupled into the input to the detector, so that the flow rate through the detector is maintained at a constant value. An adjustable impedance mechanism is provided in the by-pass flow path for adjusting the flow rate through the by-pass, and hence the flow rate through the column, without altering the resultant flow rate through the detector.

5 Claims, 4 Drawing Figures 33a
28a
12
14
$Z_1$
$TW_1$
11
13
10
$Z_2$
$TW_2$
$Z_3$
$TW_3$
31
$Z_4$
$TW_4$
28b
16
33b 15
23
20b
18
12
19
20a
10
21
13
14
22
11
17
16
24

15

23
18
12
10
19
11
13
14
$T_1$
$R_1$
$T_2$
$R_2$
$T_3$
$R_3$
$T_4$
$R_4$ 33a
28a
12
14
Z1
TW1
11
13
Z2
TW2
10
Z3
TW3
31
Z4
TW4
28b
16
33b 15
12
23
18
40
13
14
10
19
41
42
43
16
17

GAS FLOW CONTROL

This is a continuation-in-part of application Ser. No. 116,553 filed Feb. 18, 1971, now abandoned.

BACKGROUND OF THE INVENTION

The invention relates to gas flow rate control systems, and particularly to systems for controlling the flow of gas through gas chromatography apparatus.

In such apparatus a gas, consisting of a sample to be analyzed entrained in a carrier gas, is fed at a substantially constant pressure into a main flow path through a chromatographic column to a detector, such as a flame ionization detector.

In hitherto known chromatographic systems, accurate quantitative results often require time-consuming recalibration of the detector each time the rate of flow of the gas through the column is changed, as when a different column is substituted for analytical reasons. This is so with the flame ionization detector, which is widely used because of its marked sensitivity. Moreover, during the operation of the apparatus the flow through the column changes, due to changes in the operating temperature of the column for example; this changes the flow rate to the detector and creates error in the detector readings. For accurate results these errors must be evaluated and a suitable correction applied to the readings, which is difficult and time consuming, and requires a skilled operator.

It is an object of the present invention to provide a flow control system that provides automatic compensation for operator selected changes in the flow rate through the column so as to provide a substantially constant gas flow to the detector.

BRIEF SUMMARY OF THE INVENTION

The flow control system of this invention includes a flow regulator in the main flow path to the column and a by-pass flow path, having adjustable flow control means incorporated therein, with one end of the by-pass flow being coupled into the flow regulator and the other end coupled into the main flow path to the detector input. The flow regulator consists of a pressure responsive valve resiliently biased to an open position, flow impedance mechanism upstream from the valve and a pressure conducting connection between the high pressure, upstream side of the impedance mechanism and the valve operating to control the valve opening in proportion to changes in the pressure of the gas at the downstream side of the impedance mechanism so as to maintain a constant pressure differential across the impedance and hence to maintain the pressure at the downstream side of the impedance mechanism constant.

If the by-pass is fully closed, the gas flow through the column is a predetermined steady maximum that is governed by the impedance of the impedance mechanism of the flow regulator; if the by-pass means is fully open, the flow through the column is a steady minimum governed by the by-pass flow and is steady for any settings of the adjustable flow control means in the by-pass flow that are between settings corresponding, respectively, to maximum and to minimum flow through the column.

The adjustable flow control means in the by-pass flow may be a hand operated needle valve which may be calibrated in rate of flow of the gas through the column, or automatic means responsive to the flow through the column may be utilized for servo controlling the setting of a valve in the by-pass flow. Alternatively, the by-pass flow control may be provided by a plurality of flow restrictors adapted to be selectively coupled into the by-pass flow path, as by means of taps, so as to give what in effect is digital control of the flow rate through the column.

Another alternative is to provide a flow regulator in the by-pass flow path comparable to the one in the main flow path, but having the gas flow impedance means for each provided by a plurality of shared gas flow impedance elements, all of which have their upstream, high pressure, sides connected to receive the input gas in parallel. Each of the flow regulators is connected by a pressure conducting connection to the main flow path at the upstream, high pressure sides of the parallel impedance elements, and each has its downstream, low pressure, side connectable alternatively by two-way valves to direct the flow either through the regulator valve in the main flow path or through the regulator valve in the by-pass flow path. In operation, the user would switch the output of one or more impedance elements to the regulator valve in the main flow and the remainder to the regulator valve in the by-pass flow. All the impedance elements are thus connected in one or the other of the flow paths so the flow to the detector remains constant.

BRIEF DESCRIPTION OF THE DRAWINGS

The invention will now be described by way of example by reference to the accompanying diagrammatic drawings, wherein.

DETAILED DESCRIPTION

Figure 1:
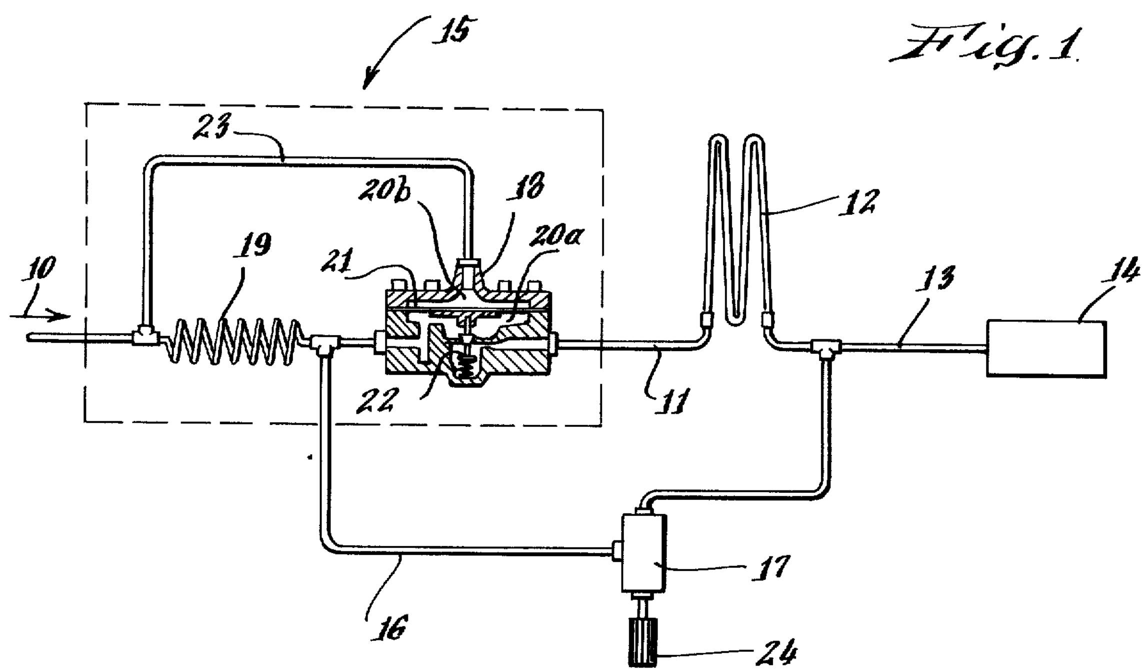
FIGS. 1 to 3 are distinct embodiments of the invention for manual operation and FIG. 4 is an embodiment introducing automatic operation.

In the embodiment shown in FIG. 1 a gas, consisting of a carrier gas in which a sample to be analyzed is entrained, is fed at a constant pressure in the direction of arrow 10 from a source, not shown, through a main flow conduit 11 to a chromatographic column 12 from which it flows through a main flow conduit 13 to a detector 14, such as a flame ionization detector. The flow control system embodying the invention comprises generally a flow regulator 15 and a by-pass conduit 16, having a needle valve 17 therein, connected between the flow regulator 15 and the main flow conduit 13 to the detector 14.

The flow regulator 15 is formed by a pressure responsive valve unit 18 and a gas flow impedance element, or restrictor 19, which may be a fixed restrictor as shown, or an adjustable valve. As shown the valve 18 is a conventional type having two chambers **20*a* and 20*b* separated by a diaphragm 21. The main flow path through the valve unit 18 is through the chamber 20*a* and the diaphragm 21 is connected to a spring loaded valve 22 for opening or closing the flow path in accordance with the relative pressures in the chambers 20*a* and 20*b*, the valve 22 being spring biased to an open position. A pressure conducting connection between the upstream, high pressure, end of the restrictor 19 and the chamber 20*b* of the valve unit 18 is provided by a conduit 23. Conduit 23 represents, therefore, an expedient means of providing a constant force acting downwards on diaphragm 21 and could in fact be replaced by a constant-force spring pressing on diaphragm 21**.

Now, the gas pressure in chamber **20*b* must always be higher than that in chamber 20*a* by the pressure drop across the restrictor 19, which drop is determined by restrictor impedance and the flow rate instantaneously occurring in the column circuit. If the impedance of the restrictor is such that under conditions near maximum column flow the pressure deficiency in chamber 20*a* equals the spring bias of valve 22, the forces acting on the two sides of the diaphragm are equal and the opening of the valve 22 is right for maintaining a datum pressure differential (typically some 3 p.s.i.) across the restrictor 19, which is tantamount to maintaining a datum pressure, i.e., the pressure from the regulated supply less the datum pressure differential, at the downstream side of restrictor 19**.

If, after the steady state conditions have been established, the pressure at the downstream side of restrictor 19 begins to fall for any reason tending to increase the flow downstream of restrictor 19, the pressure in the chamber **20*b* will no longer be balanced and the diaphragm 21 will be urged downwards to establish a smaller opening of valve 22, reduce the flow in the column circuit and build up the pressure at the downstream side of restrictor 19 to the datum value. Conversely, if the pressure at the downstream side of restrictor 19 begins to rise, for any reason tending to decrease the flow downstream of the restrictor 19, the pressure in the chamber 20*b* will be overcome and the diaphragm 21 will be urged upwards to establish a larger opening of valve 22, increase the flow in the column circuit and drop the pressure at the downstream side of restrictor 19 to the datum value. In sum, the flow regulator 15 stabilizes the column flow near its maximum value (so as to enable the by-pass to set up lower flow values) by maintaining a datum pressure at the downstream side of restrictor 19. The operation of the flow regulator 15** per se (independent of the by-pass) is quite conventional in well known flow-regulated column circuits which take care automatically of any causes of column flow variations, such as increased gas viscosity with temperature, fitting of columns of different impedance characteristics. These hitherto known circuits allow the column flow to be stabilized at any chosen value within a given range but the flow through the detector cannot be kept at a fixed value for different column flow rates; it must change in sympathy.

The upstream end of the by-pass conduit 16 that is connected into the flow regulator 15 is connected therein between the downstream, low pressure, side of the restrictor 19 and the upstream side of the valve 18. The by-pass conduit is opened and closed by the valve 17 which is adjustable by turning its knob 24.

When knob 24 is turned so that the valve 17 is fully closed, the flow through the column 12 will be at its maximum, the actual value being set by the impedance of restrictor 19 and kept constant by the action of valve 18. Turning knob 24 from the fully closed to the fully open position establishes the conditions of minimum flow, which is again maintained constant by the action of the valve 18. Intermediate positions will naturally give intermediate values of column flow.

To appreciate the operation of the arrangement illustrated in FIG. 1 it is useful to compare it with an imagined arrangement wherein a valve controlled by-pass might be shunted across the column in what might seem an obvious way of ensuring constant flow through the detector for varying flow rates through column. The obvious way is clearly unsatisfactory, however, because the gas through the column will be flow controlled when such a column by-pass is fully closed and largely pressure controlled when it is fully open, and when pressure control begins to predominate, changes in column temperature bring about changes in column flow. Even when flow control predominates, the pressure required to set up the flow will vary with the column impedance and this means that a valve in such a column by-pass could not in any case be calibrated in column flow.

Having thus established that the FIG. 1 embodiment enables the detector to be operated at a single value of steady flow for any value of flow through the column, we shall explain how to each particular setting of the valve 17 there must correspond a particular value of steady column flow so that the valve 17 can effectively be calibrated in column flow.

We already know that any given setting of the valve 17 provides a particular repeatable value of by-pass flow. We also know that when the valve 17 is fully closed the column flow will be at its maximum. If we now open up the valve to a first setting intermediate between the fully closed and the fully open position, a by-pass flow will be established corresponding to the chosen setting. The datum pressure at the downstream end of the restrictor 19 will tend to drop and cause the valve unit 18 to react by restricting the flow to the column and building up the datum pressure. The column flow is now stabilized by the flow regulator 15 at some value below maximum which is wholly determined by the first setting of valve 17. If we now turn back valve 17 to a second setting decreasing the by-pass flow, the pressure at the downstream side of restrictor 19 will tend to rise and the valve unit 18 will react by increasing the flow through the column until the pressure has fallen to the datum value. The column flow is now stabilized at a lower value entirely determined by the second setting of the valve 17.

It is now clear that an inverse proportionality must exist between the by-pass flow and the column flow in that the effect on the pressure at the downstream side of restrictor 19 of an increased flow in the by-pass can only be compensated by a corresponding decrease in flow in the column circuit since we have already observed that the sum of column flow and by-pass flow must always be a constant. The valve 17 may therefore be calibrated in column flow values. The calibration will not be affected by any disturbance tending to alter column flow, such as fitting columns of different length, since the flow regulator will automatically take care of that as in conventional flow regulated column circuits.

Figure 2:
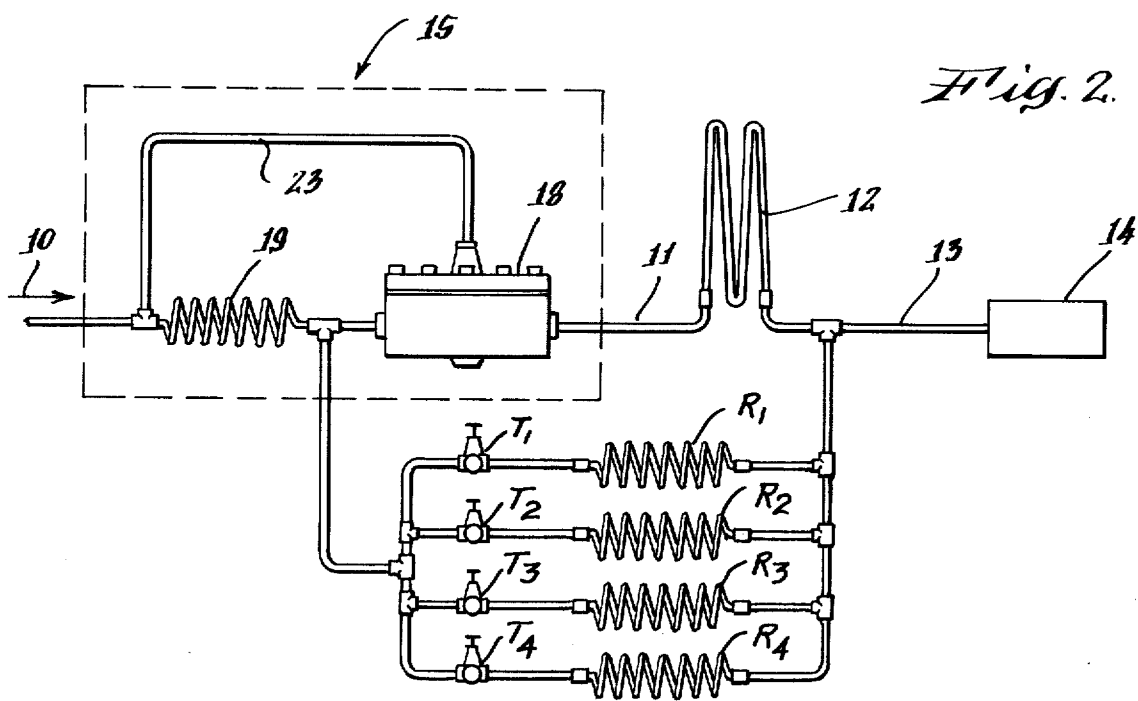

In the embodiment shown in FIG. 2, valve 17 has been replaced with restrictors R1 to R4 fed through taps T1 to T4. By selective operation of the taps set values of column flow may be established digitally. Solenoid operated valves may be used instead of the taps and selective energization of the solenoids to give a number of permutations may be arranged automatically, the user being merely required to press a button corresponding to a required column flow.

Figure 3:
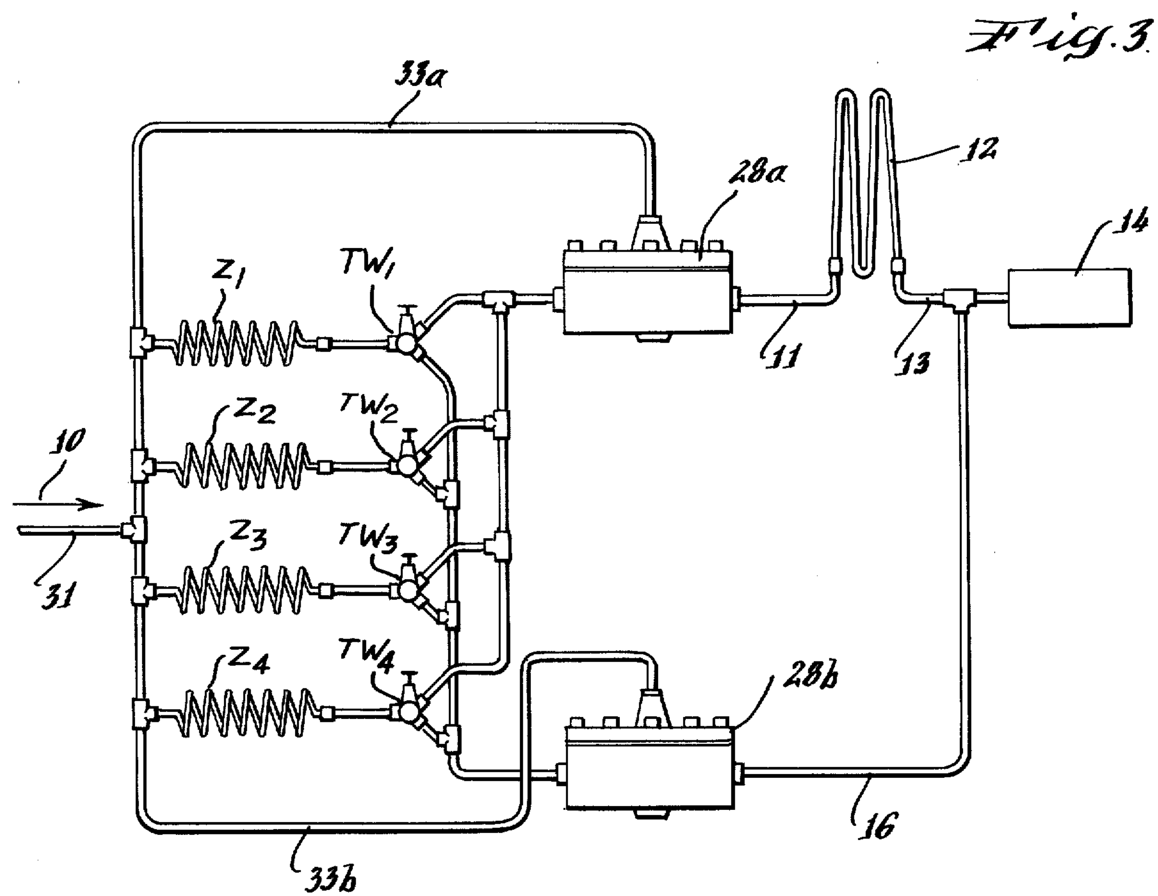

In the embodiment shown in FIG. 3 the flow regulator, comparable to the flow regulator 15 in FIG. 1, in the main flow conduit 11 is provided by valve 28*a* and a plurality of restrictors designated Z1 to Z4. Means, comparable to valve 17 in FIG. 1, for adjustably controlling the flow through the by-pass conduit 16 is provided by a flow regulator consisting of a valve 28*b* and the restrictors Z1 to Z4. The valves 28*a* and 28*b* are similar in construction to the valve 18 described above. In this instance the pressure conducting connectors, comparable to the conduit 23 in FIG. 1, for connecting the valves 28*a* and 28*b* respectively into the main gas flow at the upstream, high pressure, ends of the restrictors Z1 to Z4 are provided respectively by conduits 33*a* and 33*b* which have their upstream portions connected respectively to the upstream, high pressure sides of the restrictors Z1 and Z2, and Z3 and Z4 and into the main flow conduit portion 31 from the source. The restrictors Z1 to Z4 are thus connected in parallel and their output flows are each directed alternatively either to the main flow path to the valve 28*a* or to the by-pass flow path to the valve 28*b* by means of two way valves TW1 to TW 4 connected to the downstream sides of the restrictors Z1 to Z4 respectively, with conduits going from each valve to both the valves 28*a* and 28*b*. When the output flows from one or more of the restrictors Z1 are switched by turning one or more of the valves TW1 to TW4, to direct the flow therethrough to either the valve 28*a* or the valve 28*b*, the remainder are switched to direct their flows to the other valve, thus keeping the flow through the detector 14 constant for a number of digitally selected values of column flow. In this arrangement, both the main and the by-pass gas flows are flow controlled and it would be possible if desired to have an additional chromatographic column in the by-pass flow.

Figure 4:
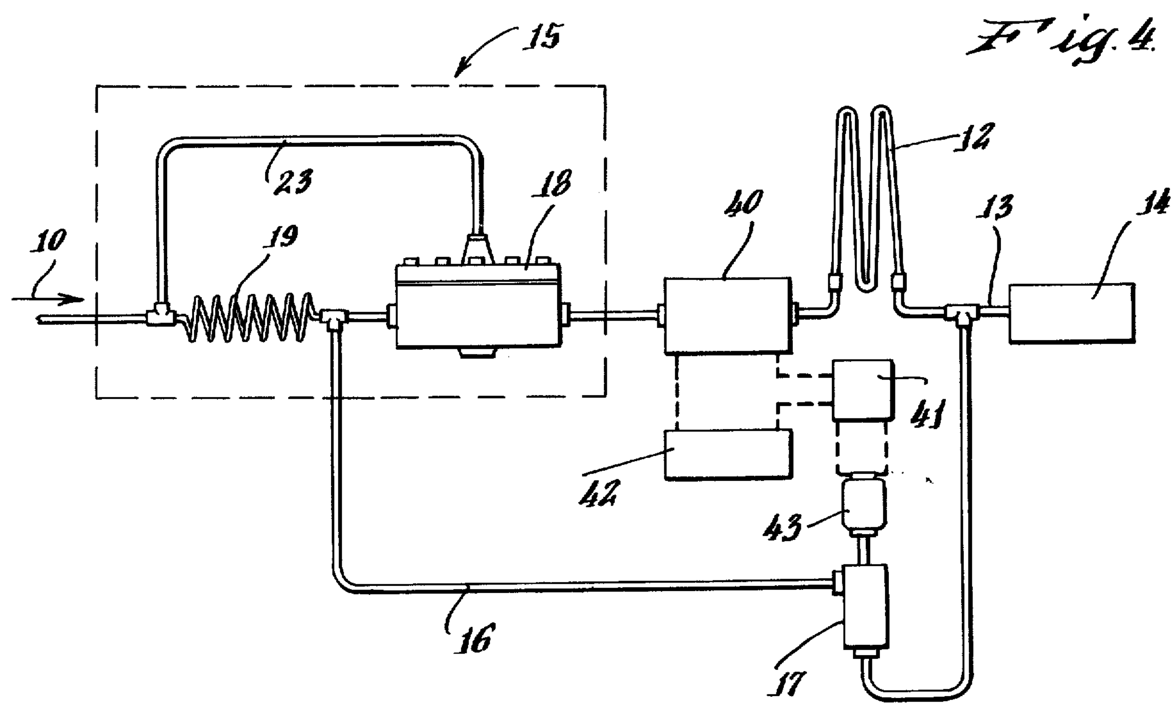

FIG. 4 is a modification designed to give automatic operation of a valve 17*a*, that replaces valve 17 in the FIG. 1 embodiment. The output signal of an electrical flowmeter 40 is compared in servo amplifier 41 with one of a series of digitally selectable reference potentials from unit 42 and the output of the amplifier 41 energizes servo motor 43 which turns needle valve 17*a* in the direction tending to make the output of flowmeter 40 equal to the reference potential actually chosen by the user. To any set reference potential there corresponds therefore a set flow which is automatically established through the servo system.

What is claimed is:

1. In gas chromatographic apparatus in which gas at a substantially constant pressure is fed from a source via a main flow path to a chromatographic column and from the column to a detector, a system for maintaining the flow rate of gas to the detector steady for various selectable rates of flow through the column comprising:

a flow regulator in the main flow path to the column consisting of a pressure responsive valve resiliently biased to an open position against a predetermined counter biasing pressure, and flow impedance means upstream from the valve, said valve being responsive to any pressure change caused by a flow change at its downstream side by adjusting the valve opening for maintaining a constant pressure at the downstream side of the impedance means in relation to the substantially constant pressure of gas from said source and thus steadying the flow through the column for any selected flow rate;

a by-pass flow path having one end coupled into the main flow path between the downstream, low pressure, side of the impedance means and said valve and having its other end coupled into said main flow path at said detector input; and variable impedance means in the by-pass flow path for changing the gas flow through the by-pass flow path whereby a change in the by-pass flow produces a change in the pressure at the downstream side of the impedance which is immediately counteracted by said pressure responsive valve means causing the opening through the pressure responsive valve to vary an amount that changes the column flow inversely the amount of the by-pass flow change so that the pressure at the downstream side of the impedance is restored to its constant value and the flow to the detector is maintained at a steady rate.

2. The system of claim 1 in which said variable impedance means in the by-pass flow path comprises a plurality of flow restrictor devices connected in parallel, and each restrictor device having a valve connected at its upstream end, whereby any selected number of the restrictor devices are adapted to be switched into and out of the by-pass flow path.

3. The system of claim 1 in which said variable impedance means in the by-pass flow path is a valve.

4. The system of claim 3 in which said by-pass path valve is an electrically operated valve and which includes:

a servo motor connected to operate said by-pass path valve;

a flowmeter in the main flow path to the column from said flow regulator producing an electrical output signal proportioned to the flow therethrough;

means producing an electric reference potential; and comparator means connected for comparing the signals from the flowmeter with said reference potential and producing an output potential in relation to the comparison; said comparator means being connected to apply its output potential to actuate said servo motor.

5. The system of claim 1 in which said flow impedance means of the flow regulator in the main flow path is a flow restrictor device and which includes:

a plurality of additional restrictor devices connected in parallel with said first mentioned restrictor device;

a second pressure responsive valve in the by-pass flow path, similar to said valve of the flow regulator in the main flow path; and a pressure conducting connection between the upstream, high pressure, sides of said parallel connected restrictor devices and said second valve and being operable to close the opening of the second valve in proportion to increases in the pressure of gas at the upstream sides of the restrictor devices;

each of said restrictor devices having a two-way valve connected at its downstream end, connected for directing the output flows from the respective restrictor devices alternatively to the valve in the main flow path and to said second valve gate in the by-pass flow path.

* * * * *